No. 879,378. PATENTED FEB. 18, 1908.
D. W. FILSTEAD.
MACHINE FOR TURNING RUBBER SHELLS OF PLATENS.
APPLICATION FILED JULY 20, 1906.
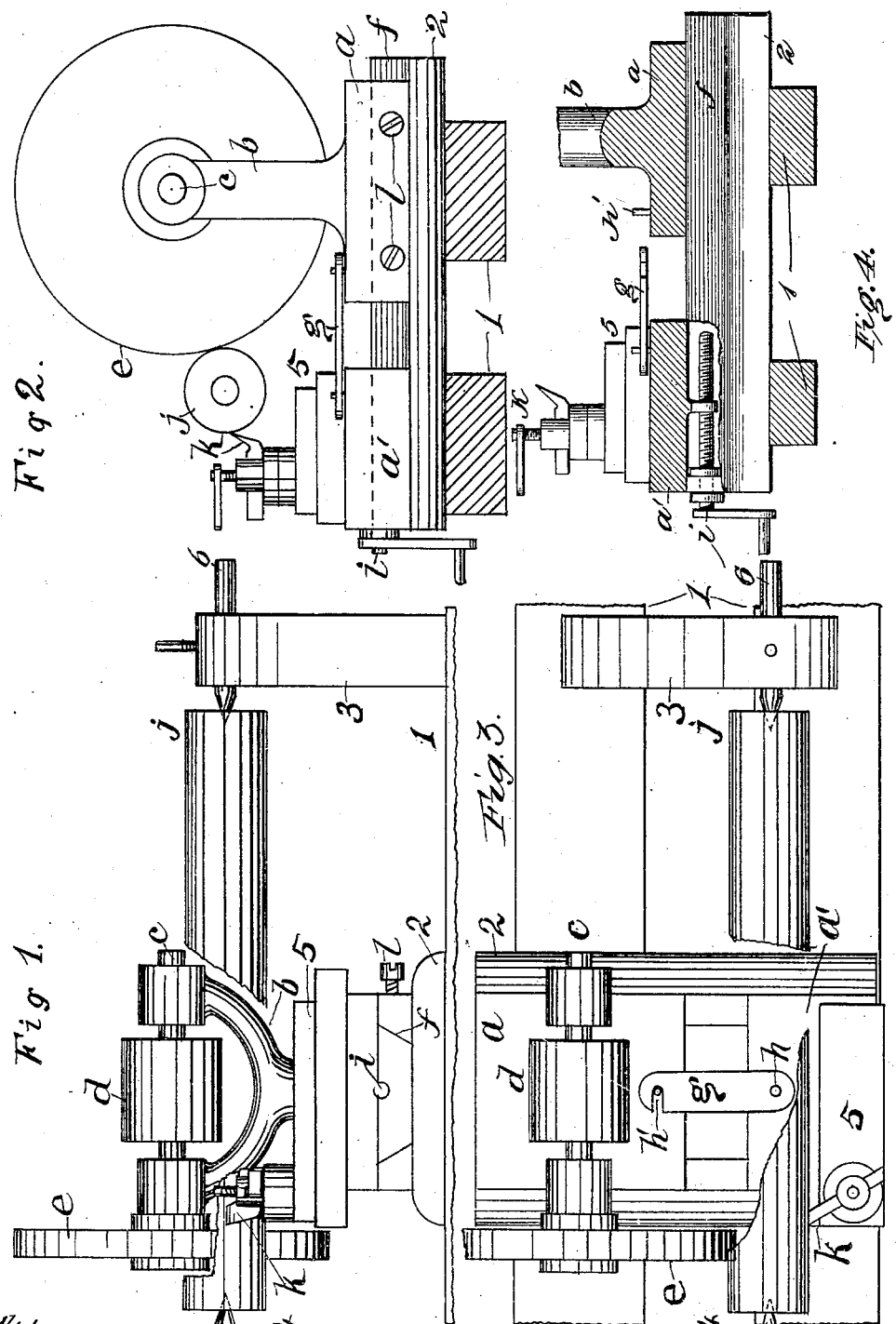
Witnesses.
Frank S. Graham
Chas. H. More
Inventor
David W. Filstead.
By Wm Zimmerman
Attorney.

UNITED STATES PATENT OFFICE.

DAVID W. FILSTEAD, OF CHICAGO, ILLINOIS, ASSIGNOR OF ONE-HALF TO ARTHUR R. AMES, OF CHICAGO, ILLINOIS.

MACHINE FOR TURNING RUBBER SHELLS OF PLATENS.

No. 879,378.  Specification of Letters Patent.  Patented Feb. 18, 1908.

Application filed July 20, 1906. Serial No. 327,024.

*To all whom it may concern:*

Be it known that I, DAVID W. FILSTEAD, a citizen of the United States, residing in Chicago, Cook county, Illinois, have invented certain new and useful improvements in machines for turning the rubber shells of platens or rollers for type-writing machines to a uniform true diameter and surface, of which the following is a full and correct specification, reference being had to the accompanying drawing, forming a part hereof, and in which—

Figure 1 shows my said new device in front elevation; Fig. 2 shows the same in end elevation, and Fig. 3 shows the same in plan view. Fig. 4 shows my lathe-carriage partly in section and shows the means whereby the tool-post carriage, or tool-carriage which is adjusted by means of a screw, may adjust a second tool-post carriage on the same lathe-carriage. Said tool-post carriages being connected and disconnected from each other by means of special mechanism, as shown.

Like reference letters denote like parts throughout.

The object of my invention is to expedite the work of turning said platens and I combine for simultaneous use a cutting and a grinding tool in a way substantially as herein disclosed and whereby it has been proven that the amount of work is about four times as great as when a grinder alone is used, as is the present custom.

To attain my said desirable end I construct my said mechanism in substantially the following manner, namely: The usual old mechanism for said work, namely: a metal turning lathe, consisting of the parts 1, 2, 3, 4, 5 and 6, and a screw for propelling the carriage 2; the screw not shown, is provided with a few new parts, namely: a base $a$ dovetailed at its bottom and held on the part $f$ of the carriage 2 and provided with set-screws $l$ to bind it to the part $f$, and from which rises the two-armed post $b$ carrying on its arm-ends bearings carrying the shaft $c$ on which, on one of its outer ends, is carried an emery-wheel $e$ and on said shaft is a pulley $d$.

The carriage carries a cutter $k$ which is provided with a cutting edge suitably adapted to cut the rubber composition which form the surface of platens.

The base $a'$ of the tool-carrying part is operated back and forth on the dovetail part $f$ in the usual way to set the cutter $k$ to its work. The base $a$ is hitched to the base $a'$ by means of a hook $g$ turning on a pin $h$ in the base $a'$ and it is hooked on the pin $h'$ in the base $a$. By means of said hook $g$ connecting the parts $a$ and $a'$ said bases may be adjusted to the proper position to set their respective tools $k$ and $e$ to their proper place, by operating the screw $i$. A short part of the roller $j$ is first cut with the tool $k$ alone so as to leave the roller a trifle large, just enough to give the grinder $e$ a chance to do its work and to do it easily, then the screws $l$ are set and the grinder is ready for an indefinite number of like sized platens. The hook $g$ which was connected to $a$ for said adjustment is then released and the cutter $k$ is again set to its place and it is then also ready to do an indefinite number of like sized platens, each platen being finished by passing said tools once from one end to the other of them.

In the old way the wheel $e$ was placed in front, where my cutter $k$ is placed, and it had to pass over the length of the platen repeatedly and tested repeatedly with a gage to see that the proper diameter was obtained, which is slow and tedious. My machine does the work without the use of a gage after the parts are once adjusted.

What I claim is:

1. A lathe-carriage provided with opposite tool-bases, a screw-adjustment between one of said bases and its carriage and releasable connecting mechanism between said base and its opposite base.

2. A lathe-carriage provided with opposite and reciprocable tool-bases whereof one of said bases has a transverse screw-adjustment, of means to connect and disconnect said base with its said opposite base.

3. A lathe-carriage provided with two tool-bases transversely adjustable thereon, a screw and nut connection between one of the bases and carriage and hinged releasable connection between said tool-bases.

DAVID W. FILSTEAD.

Witnesses:
 WM. ZIMMERMAN,
 FRANK S. GRAHAM.